(12) United States Patent
Martin

(10) Patent No.: US 11,782,291 B1
(45) Date of Patent: *Oct. 10, 2023

(54) EYEGLASSES RETAINER HEADBAND

(71) Applicant: Cindy Martin, Montgomery, TX (US)

(72) Inventor: Cindy Martin, Montgomery, TX (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/392,063

(22) Filed: Aug. 2, 2021

Related U.S. Application Data

(63) Continuation-in-part of application No. 16/660,670, filed on Oct. 22, 2019, now Pat. No. 11,079,609.

(51) Int. Cl.
*G02C 3/00* (2006.01)

(52) U.S. Cl.
CPC .................... *G02C 3/003* (2013.01)

(58) Field of Classification Search
CPC ....................................... G02C 3/003
USPC ................................. 351/155–157
See application file for complete search history.

(56) References Cited

U.S. PATENT DOCUMENTS

| | | | | |
|---|---|---|---|---|
| 3,502,396 A | * | 3/1970 | Greenberg | G02C 3/003 24/453 |
| 4,515,449 A | * | 5/1985 | Davidson | G02C 3/003 351/156 |
| 4,783,164 A | * | 11/1988 | Heiberger | G02C 3/003 351/156 |
| 4,955,087 A | * | 9/1990 | Perez | G02C 3/003 2/9 |
| 6,142,623 A | * | 11/2000 | Jones | G02C 3/003 351/158 |
| 2010/0283962 A1 | * | 11/2010 | Williams | G02C 3/003 351/157 |
| 2020/0341293 A1 | * | 10/2020 | Suh | G02B 25/004 |

* cited by examiner

*Primary Examiner* — Cara E Rakowski
(74) *Attorney, Agent, or Firm* — Nick A Nichols, Jr.

(57) ABSTRACT

A headband for securing eyeglasses on the head of a wearer may include a pair of cords secured to the temple arms of the eyeglasses. Distal ends of the cords may form end loops that fit over the temple arms and movably attach the headband to the temple arms for positioning the eyeglasses on the head of the wearer. Slide connectors may be manipulated to position and tighten the end loops of the pair of cords about the temple arms.

6 Claims, 3 Drawing Sheets

EYEGLASSES RETAINER HEADBAND

CROSS-REFERENCE TO RELATED APPLICATION

This is a continuation-in-part application of U.S. Non-Provisional application Ser. No. 16/660,670, filed Oct. 22, 2019, U.S. Pat. No. 11,079,609, which application is herein incorporated by reference in its entirety.

BACKGROUND

The present invention relates to eyewear appliances, particularly to a device for securely retaining eyeglasses on the head of a wearer.

Eyeglasses typically include lenses mounted in a front frame and temple arms extending from the front frame which rest on the wearer's ears. The ends of the temple arms may loop partially about the ears and a nose bridge or nose pads may rest upon the nose of the wearer. Various devices may be found in the prior art for securing eyeglasses in place on the head of user so that they are not easily dislodged, such as, strands that attach to the rear end portions of the eyewear temple arms and extend about the back of a user's head as disclosed in U.S. Pat. No. 3,397,023 issued to Spina. U.S. Pat. No. 8,152,298 issued to Frank discloses headgear that may be used to support eyeglasses off the bridge of the nose of a person who has undergone rhinoplasty surgery.

It is an object of the present invention to provide an eyeglasses retainer headband that may secure the eyeglasses in place and may provide pressure and/or pain relief on the nose and ears of the wearer.

SUMMARY

An eyeglasses retainer headband may include a pair of cords adjustably secured to the temple arms of the eyeglasses. Distal ends of the cords may form end loops that fit over the temple arms and may be adjusted along the temple arms for positioning the eyeglasses on the head of the wearer. Slide connectors may be manipulated to position and tighten the end loops of the pair of cords about the temple arms.

In another embodiment, an eyeglasses retainer headband may include a link separating the pair of cords. The link may include transverse holes proximate the opposite distal ends of the link. The pair of cords may pass through respective transverse holes.

In another embodiment, an eyeglasses retainer headband may include separable segments linked together by overlapping snap connector links.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
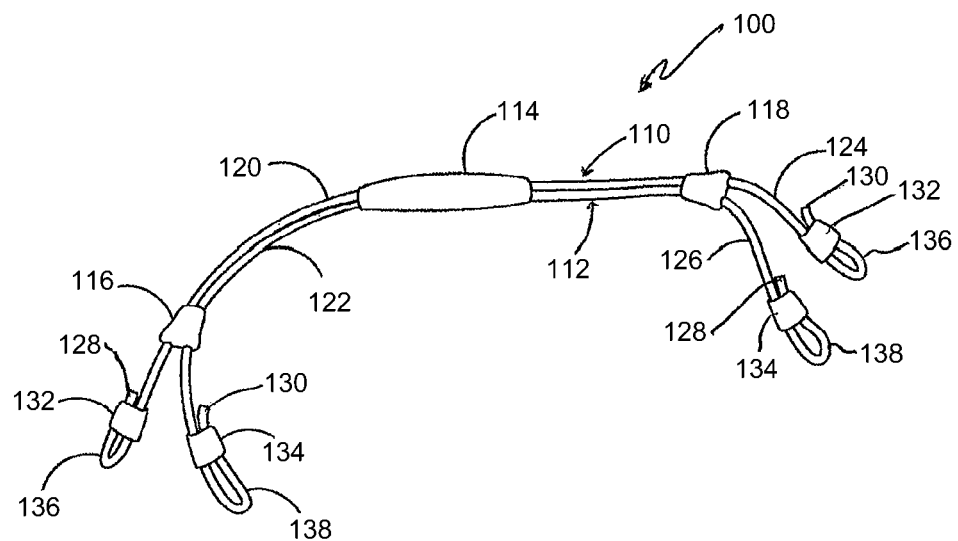
FIG. 1 is a perspective view of a first embodiment of an eyeglasses retainer headband.
Figure 2:
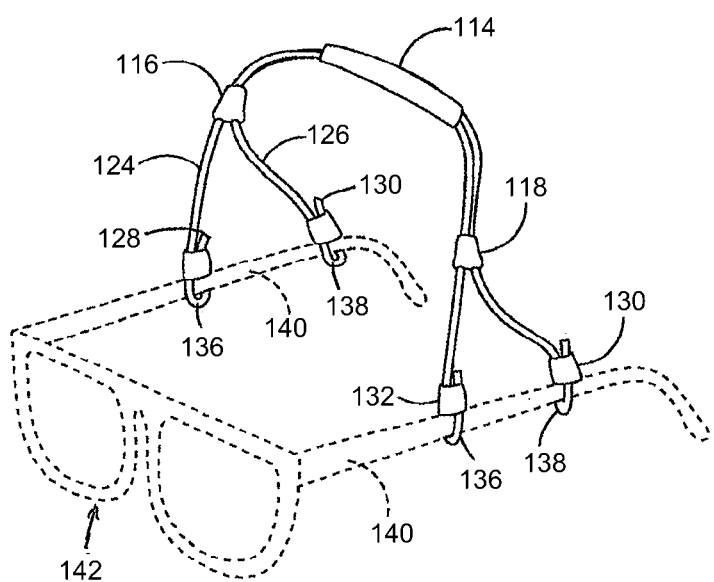
FIG. 2 is a perspective view of the eyeglasses retainer headband shown in FIG. 1 attached to a pair of eyeglasses.

Referring first to FIGS. 1 and 2, an eyeglasses retainer headband is generally identified by the reference numeral 100. The headband 100 may include cords 110 and 112 fabricated of flexible resilient material known in the art. The cords 110, 112 may be separate individual strands, however, it will be recognized that the cords 110, 112 may be joined by a webbing strip at least along a portion of the lengths thereof.

The cords 110, 112 may extend through a sleeve 114 and slide connectors 116, 118. Intermediate portions 120, 122 of the cords 110, 112, respectively, may be held relatively parallel to one another by the sleeve 114 and slide connectors 116, 118 so that the cords 110, 112 do not separate and slip apart on the head of the wearer.

Referring still to FIGS. 1 and 2, the cords 110, 112 may include end portions 124 and 126 passing through separate boreholes in the slide connectors 116, 118. The free ends 128, 130 of the end portions 124, 126 may be inserted through fasteners 132, 134. The fasteners 132, 134 may include boreholes configured to receive and frictionally grip the ends 128, 130 of the cords 110, 112 which may be inserted through one borehole of the fasteners 132, 134, looped around and inserted through the other borehole to form end loops 136, 138. The headband 100 may be secured to the eyeglasses 142 by pulling the free ends 128, 130 of the cords 110, 112 through the fastener 132, 134 to tighten the end loops 136, 138 on the temple arms 140 of the eyeglasses 142.

Figure 3:
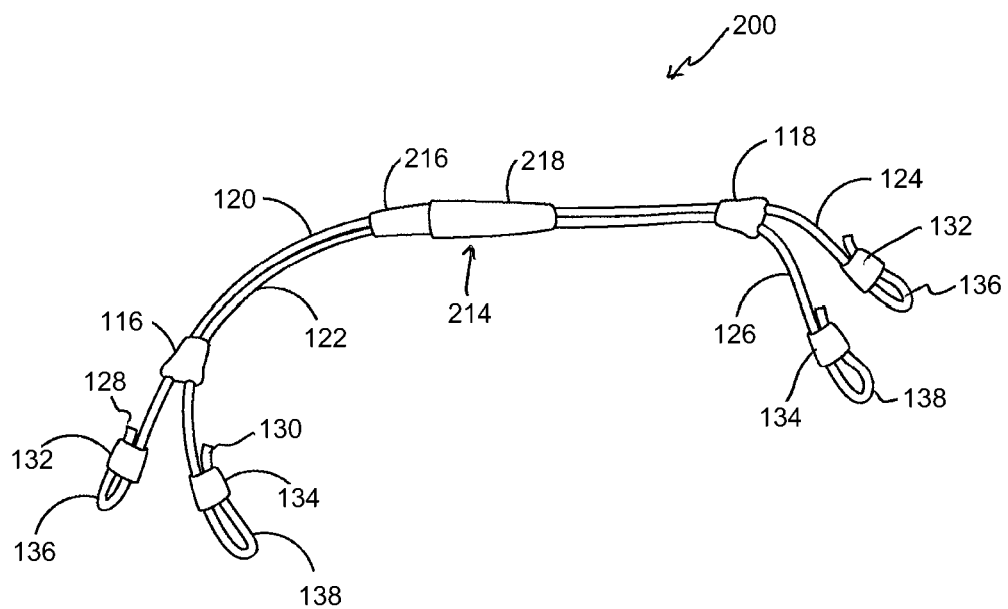
FIG. 3 is a perspective view of a second embodiment of an eyeglasses retainer headband.
Figure 4:
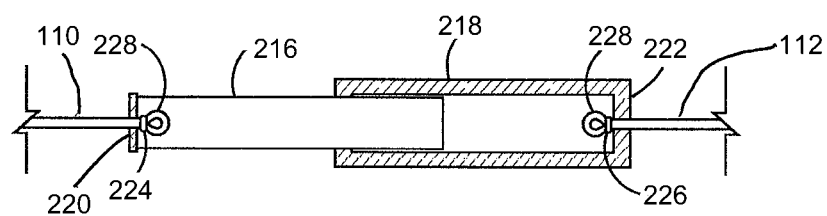
FIG. 4 is a partial section view illustrating the sleeve component of the eyeglasses retainer headband shown in FIG. 3.

Referring now to FIGS. 3 and 4, a second embodiment of an eyeglasses retainer headband is generally identified by the reference numeral 200. As evidenced by the use of common reference numeral, the headband 200 is similar to the headband 100 described above with the exception that the sleeve 214 comprises tubes 216 and 218. The tubes 216, 218 include elongated tubular bodies sized and arranged for one to slid within the other forming a friction connection therebetween. An end of the tubes 216, 218 may be closed by transverse end walls 220 and 222, respectively. The end walls 220, 222 may include through holes 224 and 226, respectively. Distal ends of the cords 110, 112 may be tied into knots 228 to prevent the cords 110, 112 from separating from the tubes 216, 218.

The headband 100 may be sized to fit the head of a typical wearer but may be adjusted to fit different head sizes. The length of the headband 100 may be adjusted by sliding the fasteners 132, 134 on the end portions 124, 126 of the cords 110, 112 closer to or farther away from the slide connectors 116, 118, thereby shortening or lengthening the headband 100. In use, the headband 100 may be attached the temple arms 140 of the eyeglasses 142 by sliding the end loops 136, 138 over the temple arms 140. The loops 136 of the end portions 124 may be fastened on the temple arms 140 forward of the loops 138, for example but without limitation, proximate the mid-point of the temple arms 140. The loops 138 may, by way of example but without limitation, be fastened proximate the distal ends of the temple arms 140. The headband 100 may be fitted on the wearer's head and the end loops 136, 138 may be further adjusted along the temple arms 140 to comfortably secure the eyeglasses 142 on the wearer's head, and thereby alleviate any pain and pressure on the nose and ears of the wearer that may be caused by the eyeglasses 142.

Figure 5:
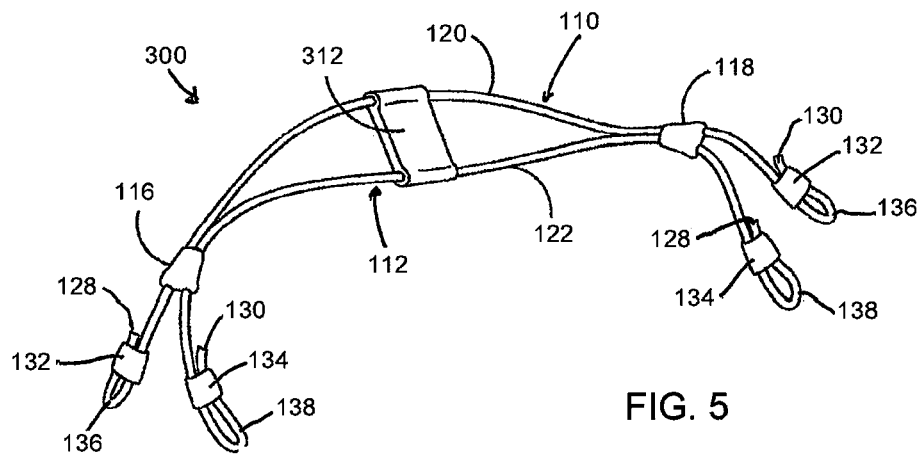
FIG. 5 is a perspective view of a third embodiment of an eyeglasses retainer headband.
Figure 6:
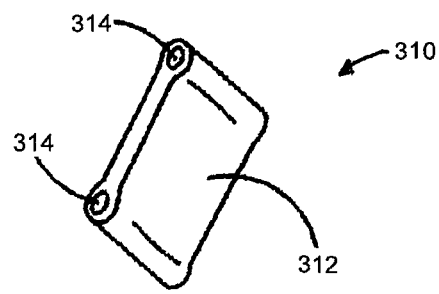
FIG. 6 is a perspective view of a cord spacer element of the eyeglasses retainer headband shown in FIG. 5.

Referring now to FIG. 5, a third embodiment of an eyeglasses retainer headband is generally identified by the reference numeral 300. As evidenced by the use of common reference numeral, the headband 300 is similar to the headband 100 with the exception that the headband 300 includes a link 310 separating the cords 110 and 112 proximate the midportion thereof. The link 310 may include an elongated link body 312 having a length dimension greater than the width dimension, best shown in FIG. 6. Holes or passages 314 may extend transverse to the longitudinal axis of the link body 312 proximate the opposite distal ends of the link body 312. The link 310 may be fabricated of a flexible, stiff material, such as but not limited to, plastic. In use, the link 310 maintains the separation of the headband cord 110, 112 to provide a more secure fit over the user's head. The cords 110, 112 pass through respective boreholes 314. One of the cords 110, 112 may be longer than the other of the cords 110, 112 to ensure sufficient cord length to fully slid along the temple arms 140. The cord 110 sits further back on the user's head spaced apart from the cord 112 by the link 310 so that the headband 300 circumscribes an area of the user's head enabling a secure fit therewith.

Figure 7:
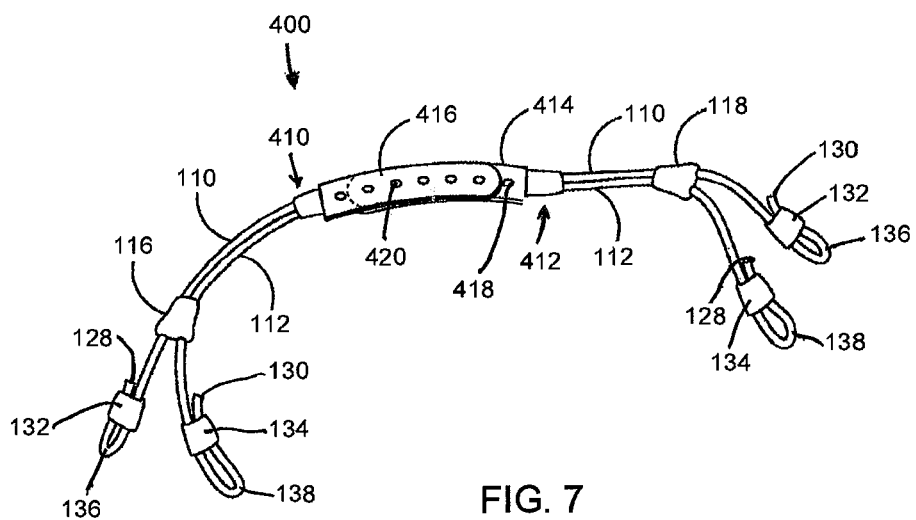
FIG. 7 is a perspective view of a fourth embodiment of an eyeglasses retainer headband.

Referring now to FIG. 7, a fourth embodiment of an eyeglasses retainer headband is generally identified by the reference numeral 400. As evidenced by the use of common reference numeral, the headband 400 is similar to the headband 100 with the exception that the eyeglasses retainer headband 400 may comprise two separable segments 410, 412 linked together by overlapping snap connector links 414, 416. Each headband segment 410, 412 may include cords 110, 112 configured in the manner described above in reference to headband 100. The headband segments 410, 412 may be fixedly secured to the snap connector links 414, 416 which, for example but without limitation, may be push-in type connectors. That is, one snap connector link 414, 416 may include a plurality of beads 418 linearly spaced along the length thereof and the other connector link may include a corresponding plurality of holes 420 in linear alignment. The length of the headband 400 may be adjusted by unsnapping the snap connector links 414, 416 and then snapped together again to the desired length.

While a preferred embodiment of the invention has been shown and described, other and further embodiments of the invention may be devised without departing from the basic scope thereof, and the scope thereof is determined by the claims which follow.

The invention claimed is:

1. A headband for retaining eyeglasses on a wearer's head, comprising:
   a) a pair of cords, each said pair of cords including a first end portion and a second end portion;
   b) a link coupling said pair of cords;
   c) a first slide connector and a second slide connector coupling a respective said first end portion and a respective said second end portion of said pair of cords; and
   d) each said pair of cords including two end loops adapted for attaching said pair of cords to a temple arm of the eyeglasses.

2. The headband of claim 1 wherein said link includes an elongated body having transversely extending holes proximate opposite distal ends of said body.

3. The headband of claim 2 wherein said pair of cords extend through a respective said holes, said link maintaining a spaced relationship proximate a midportion of said pair of cords.

4. The headband of claim 1 wherein said end loops are adjustable along the temple arms of the eyeglasses.

5. The headband of claim 1 wherein said pair of cords include separable segments joined to one another by said link.

6. The headband of claim 5 wherein said link comprises a pair of snap connector links, one of said pair of snap connector links includes a plurality of linearly spaced beads and the other of said pair of snap connector links includes a plurality of corresponding holes for receipt of said beads.

* * * * *